Patented Apr. 27, 1926.

1,582,847

UNITED STATES PATENT OFFICE.

DAVID BAIRD MACDONALD, OF LEICESTER, ENGLAND.

TREATMENT OF WASTE CINEMATOGRAPHIC FILMS.

No Drawing.     Application filed May 6, 1922. Serial No. 559,069.

*To all whom it may concern:*

Be it known that I, DAVID BAIRD MACDONALD, subject of the King of Great Britain, residing at Leicester, in the county of Leicester, England, have invented certain new and useful Improvements in the Treatment of Waste Cinematographic Films, of which the following is a specification.

This invention relates to the treatment of waste cinematographic and photographic films and the like for the recovery of silver and gelatine and comprehends a new or improved process as will be hereinafter described.

Heretofore, as far as I am aware, the recovery of silver from films of the above mentioned character has necessitated the destruction or loss of the gelatine. By means of the process forming the present invention both the silver and gelatine can be recovered for further use.

The principal feature of my invention consists in the conversion of the silver into chloride of silver in situ, without deleteriously affecting the gelatine.

This conversion may be effected by a suitable solution of a higher chloride, such as ferric chloride, cupric chloride or per chloride in the presence of hydrochloric acid.

By first passing the film or the like through a solution of sodium sulphate and then treating it with a suitable solution of a higher chloride such for example as cupric chloride or cupric sulphate in the presence of hydrochloric acid, the silver is converted while in situ into silver chloride which can then be extracted by a suitable solution without deleteriously affecting the gelatine, the silver being subsequently recovered from the extracting solution and the gelatine removed from the film or the like by known means. For instance, the silver may be recovered by electrolysis or by precipitation and the gelatine removed by hot water.

Briefly stated, the complete process consists in passing the film through a solution of sodium sulphate treating the film with a higher chloride in hydrochloric acid to convert the silver to the chloride form, washing the film in cold water to remove any traces of the copper salt, then extracting the silver chloride by suitable treatment, then washing the film in cold water, then removing the gelatine by hot water treatment, and then evaporating the water to recover the gelatine.

In carrying out the process, the conversion of the silver salt into the chloride form is found to be complete approximately when the black portions of the exposed film are rendered milky white. During treatment of the film there is a possibility of the deposit thereon of cuprous salt, this being especially the case when the solution of copper salt is strong. To prevent such deposit forming, the film may be passed through a bath of sodium sulphate solution prior to the treatment with the cupric chloride, or a current of air or oxygen may be blown through the solution, or the treated film may be exposed to the air. Or, for the same purpose, the treated film may be washed in acidulated water (preferably with hydrochloric acid) which is aerated with atmospheric air or oxygen or with some other oxidizing agent, and then washed in cold water.

The silver chloride may be extracted from the treated film by a thiosulphate solution, or solution of potassium or sodium cyanide, this treatment being carried on until the film becomes quite transparent, after which the film is washed in cold water with or without the addition of a hardening agent such as alum or the like, or the water may contain a neutralizing agent such as sodium bicarbonate or the like.

The pure gelatine is then removed from the film by hot water which may contain a little alkali such as sodium hydroxide, ammonia or the like. The gelatine solution may now be evaporated by any of the well known processes until it assumes a condition suitable for industrial purposes, or it may, after suitable concentration, be made into sheet gelatine by any known method, or it may be evaporated to a suitable consistence and used again for making the emulsion.

The silver may be recovered direct from the cyanide solution by electrolysis, or it may be recovered in the form of sulphide from the thiosulphate solution by precipitation or otherwise.

Alternatively I may use for the purpose of converting the silver into chloride of silver, a solution of ferric chloride in the presence of hydrochloric acid, or a mixture of iron sulphate and hydrochloric acid raising the iron salt to the ferric condition by any of the well known means, or I may use, in the presence of hydrochloric acid, the perchloride or per salts of such similarly acting chemicals.

I find there is a tendency for the gelatine in the film to absorb the copper or iron salts during the process of converting the silver to the chloride form and to retain such salts during the subsequent baths. This retention interferes with the subsequent baths, especially the thiosulphate bath, and in order to overcome this difficulty and obtain the best results, the film or the like should, prior to the conversion process, be passed through a solution of sodium sulphate as already stated. The treatment of the film by the last mentioned solution not only counteracts the tendency previously referred to but also facilitates the conversion into silver chloride during the subsequent process.

What I claim then is:—

1. A process for treating cinematographic and photographic films and the like for the recovery of silver and gelatine consisting in converting the silver into chloride of silver in situ by a higher chloride in the presence of hydrochloric acid, extracting the silver chloride, and then removing the gelatine.

2. A process for treating cinematographic and photographic films and the like, for the recovery of silver and gelatine, wherein the conversion of the silver into chloride of silver is effected by a higher chloride in the presence of hydrochloric acid.

3. A process for treating cinematographic and photographic films and the like, for the recovery of silver and gelatine, which consists in passing the film through a solution of sodium sulphate, treating the film with a higher chloride in the presence of a solution of hydrochloric acid to convert the silver into the chloride form, washing the film in cold water, then extracting the silver chloride, then washing the film in cold water, and then removing the gelatine.

4. A process for treating photographic films for the recovery of silver and gelatine, which consists in converting the silver contained in the film into chloride of silver by means of a higher chloride, then recovering the silver chloride, and then removing the gelatine.

5. A process for the treatment of photographic films for the recovery of the silver and gelatine, which consists in first treating the films to a solution of sodium sulphate, then treating them to a solution of cupric chloride in the presence of hydrochloric acid, whereby the silver is converted into a chloride, and then separately extracting the silver chloride and gelatine.

In testimony whereof I affix my signature.

DAVID BAIRD MACDONALD.